United States Patent
Karkhanis

(10) Patent No.: US 11,665,137 B2
(45) Date of Patent: May 30, 2023

(54) SYSTEMS, METHODS, AND MEDIA FOR SECURING CONNECTIONS TO INTERNET OF THINGS DEVICES

(71) Applicant: McAfee, LLC, Santa Clara, CA (US)

(72) Inventor: Sameer D. Karkhanis, San Jose, CA (US)

(73) Assignee: McAfee, LLC, Santa Clara, CA (US)

(*) Notice: Subject to any disclaimer, the term of this patent is extended or adjusted under 35 U.S.C. 154(b) by 405 days.

(21) Appl. No.: 16/354,932

(22) Filed: Mar. 15, 2019

(65) Prior Publication Data

US 2020/0296076 A1 Sep. 17, 2020

(51) Int. Cl.
G06F 13/00 (2006.01)
H04L 9/40 (2022.01)
H04L 67/12 (2022.01)

(52) U.S. Cl.
CPC ............. *H04L 63/02* (2013.01); *H04L 67/12* (2013.01)

(58) Field of Classification Search
CPC ... H04L 63/02; H04L 67/12; H04L 2463/082; H04L 63/08; H04L 63/0245; H04L 63/0227; G16Y 30/10; G16Y 30/00; G16Y 40/50
USPC .... 709/227–229, 203, 250; 726/3–6, 11, 12, 726/22–24
See application file for complete search history.

(56) References Cited

U.S. PATENT DOCUMENTS

| | | | |
|---|---|---|---|
| 8,244,864 B1 * | 8/2012 | Bahl | H04L 67/148 709/228 |
| 8,271,774 B1 | 9/2012 | Nachenberg et al. | |
| 8,433,682 B2 * | 4/2013 | Ngo | G06F 11/1471 707/639 |
| 10,098,026 B1 | 10/2018 | Lachwani et al. | |
| 10,425,419 B2 | 9/2019 | Jayawardena | |
| 10,511,602 B2 * | 12/2019 | Siwal | H04L 63/10 |
| 10,623,390 B1 | 4/2020 | Rosenhouse | |
| 10,742,396 B2 * | 8/2020 | Suthar | H04W 8/02 |
| 10,764,294 B1 | 9/2020 | Wasiq | |
| 10,841,271 B2 * | 11/2020 | Karkhanis | H04W 4/70 |

(Continued)

FOREIGN PATENT DOCUMENTS

| | | |
|---|---|---|
| ER | 2020140 | 8/2009 |
| WO | WO 2007055915 | 5/2017 |
| WO | WO 2018183542 | 10/2018 |

OTHER PUBLICATIONS

The Complete Idiot's Guide to Networking; Second Edition; Bill Wagner and Chris Negus (Year: 1999).*

(Continued)

*Primary Examiner* — Kenneth R Coulter

(74) *Attorney, Agent, or Firm* — Byrne Poh LLP

(57) ABSTRACT

Mechanisms (which can include systems, methods, and media) for securing connections to IoT devices are provided. In some embodiments, systems for securing connections to Internet of Things (IoT) devices are provided, the systems comprising: a memory; and a hardware processor coupled to the memory and configured to: receive first inbound traffic at a router from a wide area network (WAN), wherein the first inbound traffic is destined for a first IoT device; block the first inbound traffic at the router; notify a server on the WAN that the first inbound traffic has been blocked; receive instructions from the server indicating to unblock the first inbound traffic; and unblock the first inbound traffic.

18 Claims, 3 Drawing Sheets

(56) References Cited

U.S. PATENT DOCUMENTS

| | | | |
|---|---|---|---|
| 11,146,534 B1* | 10/2021 | Lewin | H04L 63/1441 |
| 11,336,613 B2* | 5/2022 | Karkhanis | H04L 61/103 |
| 2004/0075683 A1 | 4/2004 | Savage | |
| 2011/0161295 A1* | 6/2011 | Ngo | G06F 16/2477 |
| | | | 707/645 |
| 2012/0227093 A1 | 9/2012 | Shatzkamer et al. | |
| 2015/0249672 A1 | 9/2015 | Burns et al. | |
| 2015/0312236 A1 | 10/2015 | Ducker | |
| 2017/0111336 A1 | 4/2017 | Davis et al. | |
| 2017/0353462 A1* | 12/2017 | Siwal | H04L 63/108 |
| 2019/0268342 A1 | 8/2019 | Rossman et al. | |
| 2019/0380031 A1* | 12/2019 | Suthar | H04L 41/0896 |
| 2020/0028821 A1* | 1/2020 | Weisshaupt | H04L 67/025 |
| 2021/0314302 A1* | 10/2021 | Lewin | G06F 9/445 |

OTHER PUBLICATIONS

International Preliminary Report on Patentability dated Sep. 30, 2021 in International Patent Application No. PCT/US2020/022737, pp. 1-7.
International Search Report and Written Opinion dated Jul. 2, 2020 in International Patent Application No. PCT/US2020/022737, pp. 1-10.
Extended European Search Report dated Aug. 30, 2021 in EP Patent Application No. 21166629.2, pp. 1-8.
Extended European Search Report dated Nov. 11, 2022 in EP Patent Application No. 20 772 939.3, pp. 1-8.
Office Action dated Jun. 17, 2022 in U.S. Appl. No. 17/060,576, pp. 1-21.
Office Action dated Dec. 22, 2022 in U.S. Appl. No. 17/060,576, pp. 1-30.

* cited by examiner

SYSTEMS, METHODS, AND MEDIA FOR SECURING CONNECTIONS TO INTERNET OF THINGS DEVICES

BACKGROUND

Although router firewall policies provide a way to control inbound traffic from the Internet to Internet of Things (IoT) devices inside the home, frequently these policies are complex and very difficult for a non-technical user to understand. Additionally, the user has to be aware of all devices that are opening (or forwarding) ports to the Internet even if one is willing to configure the firewall policies. Many IoT device manufacturers forward ports without making users aware of this for reasons not directly related to the usage of IoT devices, even though these ports are susceptible to becoming vectors for infecting the IoT devices from Internet.

Accordingly, there is a need for new systems, methods, and media for securing connections to IoT devices.

SUMMARY

In accordance with some embodiments, systems, methods, and media for securing connections to IoT devices are provided. In some embodiments, systems for securing connections to Internet of Things (IoT) devices are provided, the systems comprising: a memory; and a hardware processor coupled to the memory and configured to: receive first inbound traffic at a router from a wide area network (WAN), wherein the first inbound traffic is destined for a first IoT device; block the first inbound traffic at the router; notify a server on the WAN that the first inbound traffic has been blocked; receive instructions from the server indicating to unblock the first inbound traffic; and unblock the first inbound traffic.

In some embodiments, methods for securing connections to Internet of Things (IoT) devices are provided, the systems comprising: receiving first inbound traffic at a router from a wide area network (WAN), wherein the first inbound traffic is destined for a first IoT device; blocking the first inbound traffic at the router; notifying a server on the WAN that the first inbound traffic has been blocked; receiving instructions from the server indicating to unblock the first inbound traffic; and unblocking the first inbound traffic.

In some embodiments, non-transitory computer-readable media containing computer executable instructions that, when executed by a processor, cause the processor to perform a method for securing connections to Internet of Things (IoT) devices are provided, the method comprising: receiving first inbound traffic at a router from a wide area network (WAN), wherein the first inbound traffic is destined for a first IoT device; blocking the first inbound traffic at the router; notifying a server on the WAN that the first inbound traffic has been blocked; receiving instructions from the server indicating to unblock the first inbound traffic; and unblocking the first inbound traffic.

DETAILED DESCRIPTION

In accordance with some embodiments, mechanisms (which can include systems, methods, and media) for securing connections to Internet of Things (IoT) devices are provided.

In some embodiments, these mechanisms can intercept in-bound traffic to IoT devices, block the traffic unless a user has indicated that the traffic is to be allowed or the user has logged in when attempting to connect from a browser, and, when a user has indicated that a traffic is to be allowed, pass traffic to the IoT device for a specified period of time.

In some embodiments, these mechanisms thereby make users aware of in-bound traffic to IoT devices in their homes and let the users control the traffic without needing to deal with the complexities of router firewall rules and/or policies.

Figure 1:
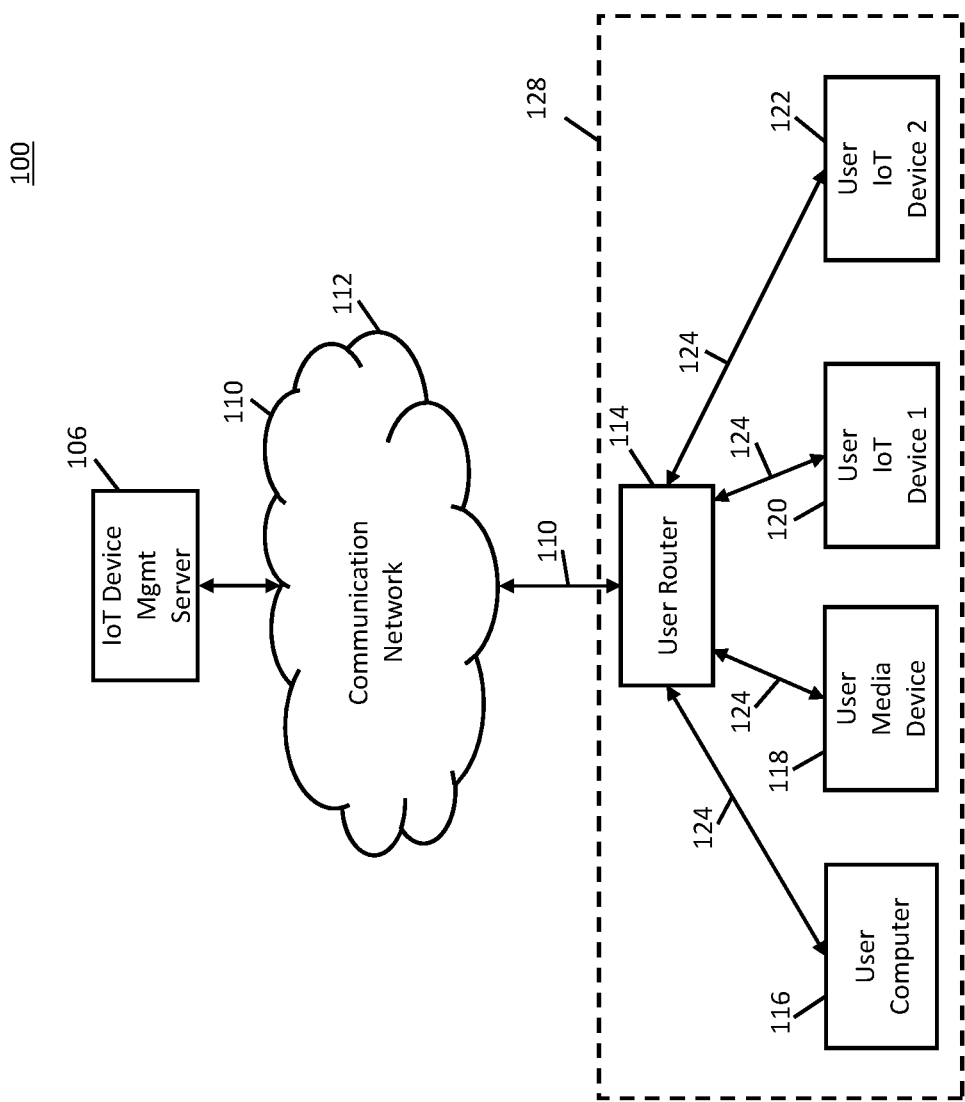
FIG. 1 illustrates an example of hardware that can be used in accordance with some embodiments.

Turning to FIG. 1, an example 100 of hardware for securing connections to Internet of Things (IoT) devices in accordance with some embodiments of the disclosed subject matter is shown. As illustrated, hardware 100 can include an IoT device management server 106, a communication network 112, a user router 114, a user computer 116, a user media device 118, and user Internet-of-Things (IoT) devices 120 and 122.

IoT device management server 106 can be any suitable server for managing IoT devices. For example, in some embodiments, IoT device management server 106 can be any server for managing IoT devices and can perform any suitable functions, such as processes 330 and 340 of FIG. 3.

Communication network 112 can be any suitable combination of one or more wired and/or wireless networks in some embodiments. For example, in some embodiments, communication network 112 can include any one or more of the Internet, a mobile data network, a satellite network, a local area network, a wide area network, a telephone network, a cable television network, a WiFi network, a WiMax network, and/or any other suitable communication network.

In some embodiments, communication network 112 and the devices connected to it can form or be part of a wide area network (WAN).

IoT device management server 106 and user router 114 can be connected by one or more communications links 110 to communication network 112. The communications links can be any communications links suitable for communicating data among IoT device management server 106, user router 114, and communication network 112, such as network links, dial-up links, wireless links, hard-wired links, any other suitable communications links, or any suitable combination of such links.

User router 114 can be any suitable router. For example, in some embodiments, user router 114 can be any router for routing traffic between user computer 116, user media device 118, user Internet-of-Things (IoT) devices 120 and 122, and/or the Internet, and can perform any suitable functions such as process 300 of FIG. 3.

Figure 3:
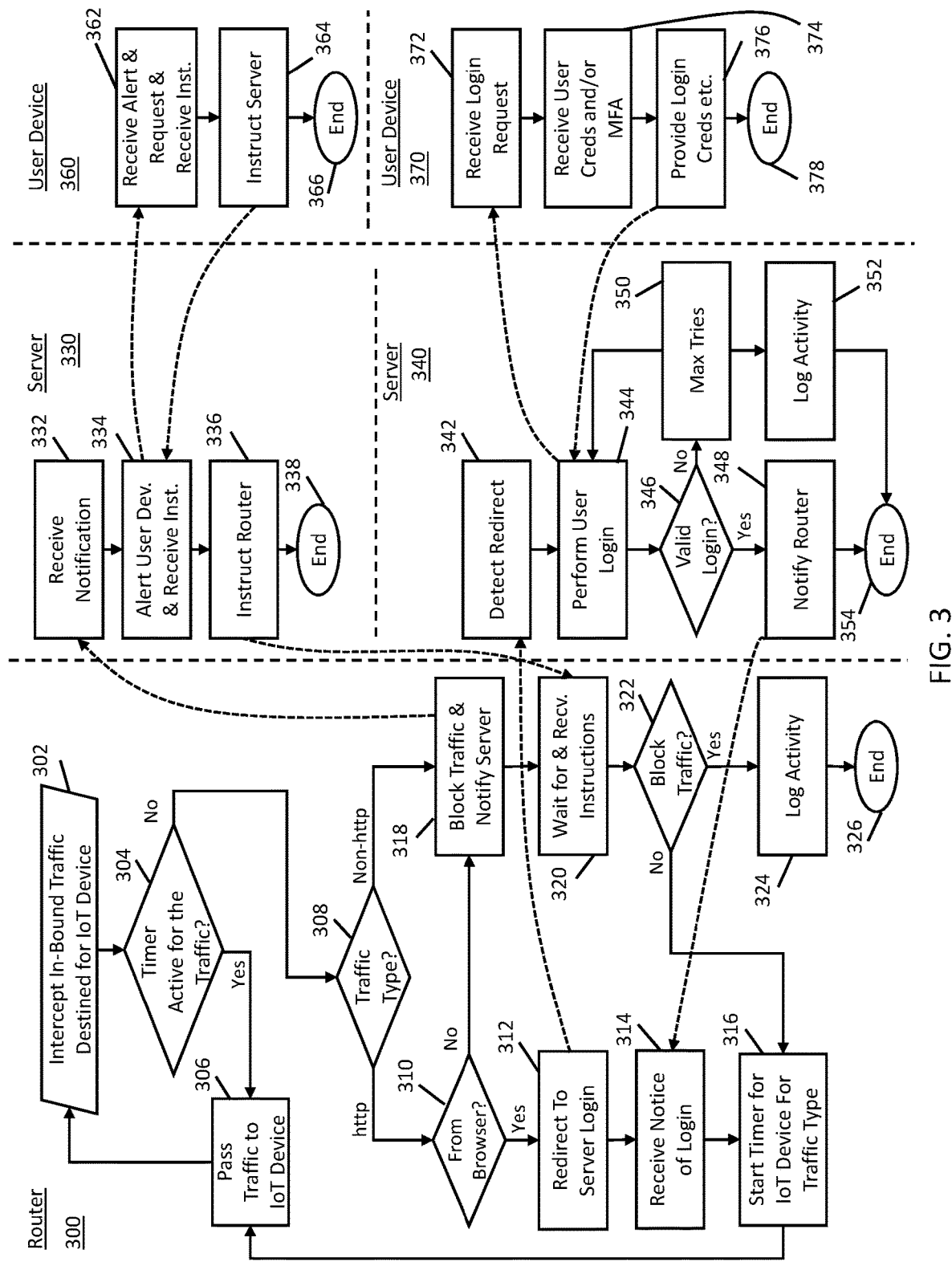
FIG. 3 illustrate examples of a processes for securing connections to IoT devices in accordance with some embodiments.

User computer 116 can be any suitable computer, such as a desktop computer, a laptop computer, a tablet computer, a smart phone, and/or any other suitable computer device, and can perform any suitable functions such as processes 360 and 370 of FIG. 3.

User media device 118 can be any suitable device for streaming media, such as a media player box, a media player dongle (which can stream video and audio, video only, or audio only), a smart television, etc.

User IoT devices 120 and 122 can be any suitable Internet of Things devices, such as internet protocol cameras, smart smoke alarms, smart thermostats, smart locks, alarms, sensors, light bulbs, hubs, smart speakers, and/or any other device that can be connected to a computer network.

User computer 116, user media device 118, and user IoT devices 120 and 122 can be connected by one or more communications links 124 to user router 114. The communications links can be any communications links suitable for communicating data among user computer 116, user media device 118, user IoT devices 120 and 122, user router 114, such as network links, dial-up links, wireless links, hardwired links, any other suitable communications links, or any suitable combination of such links.

In some embodiments, user computer 116, user media device 118, user IoT devices 120 and 122, communications links 124, and user router 114 can form or be part of a local area network 128.

Although one IoT device management server 106, one user router 114, one user computer 116, one user media device 118, and two user IoT devices 120 and 122 are shown in FIG. 1 to avoid over-complicating the figure, any suitable numbers (including zero in some embodiments) of these devices can be used in some embodiments.

Figure 2:
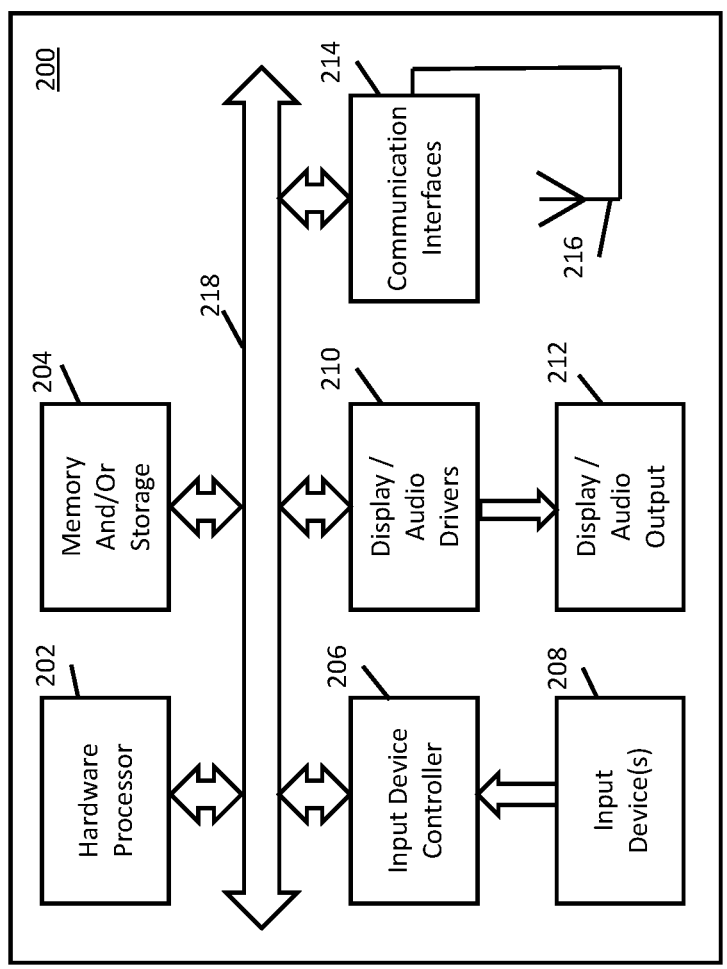
FIG. 2 illustrates a more particular example of hardware that can be used for certain components of the hardware of FIG. 1 in accordance with some embodiments.

IoT device management server 106, user router 114, user computer 116, user media device 118, and/or user IoT devices 120 and 122 can be implemented using any suitable hardware in some embodiments. For example, in some embodiments, IoT device management server 106, user router 114, user computer 116, user media device 118, and/or user IoT devices 120 and 122 can be implemented using any suitable general-purpose computer or special-purpose computer. For example, a user IoT device, such as a smart lock or smart camera, can be implemented using a special-purpose computer. Any such general-purpose computer or special-purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 204 can be any suitable memory and/or storage for storing programs, data, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from a device in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 112 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can additionally or alternatively be included in hardware 200 in accordance with some embodiments.

Turning to FIG. 3, an illustration of examples 300, 330, 340, 360, and 370 of processes that can be performed in accordance with some embodiments. As illustrated, process 300 can be executed by user router 114 in some embodiments, processes 330 and 340 can be executed by IoT device management server 106 in some embodiments, and process 360 and 370 can be executed by a user device 116, 118, 120, or 122 in some embodiments.

As shown, process 300 begins by intercepting in-bound traffic destined for an IoT device at 302. The traffic can be determined as being destined for an IoT device in any suitable manner, such as based on a fingerprint of an IoT device. For example, in some embodiments, a fingerprint of an IoT device can identify MAC address(es) of the device, a host name associated with the device, network discovery probes (e.g., UpnP, MDNS (Bonjour), NetBIOS, and SNMP) used by the device, open ports on the device, user agents used by the device, DNS requests made by the device, DHCP vendor and vendor options used by the device, and network characteristics (e.g., domains visited, content of packets sent/received, interpacket arrival rate, TTL, etc.) of the device, and/or any other observable trait of the device or a combination of all traits mentioned above. In some embodiments, any device that is not a desktop computer, laptop computer, tablet computer, or mobile phone can be designated as being an IoT device.

Traffic can be intercepted in any suitable manner. For example, traffic can be intercepted using a transparent proxy (e.g., TPROXY) or by using iptables REDIRECT.

Next, at 304, process 300 can determine whether there is a timer is active for the traffic received at 302. This determination can be made in any suitable manner in some embodiments. For example, in some embodiments, a timer can be determined as being active for traffic when the timer designates an IoT device to which the traffic is destined, when the timer is for a traffic type (e.g., hyper-text transfer protocol (http) traffic, non-http traffic, or any other suitable type of traffic) corresponding to the traffic, and/or when the timer corresponds to any other characteristic of the traffic.

If a timer for the traffic is determined to be active at 304, then, at 306, process 300 can pass the traffic to the corresponding IoT device at 306 and then loop back to 302. The traffic can be passed to the IoT device in any suitable manner. For example, a transparent proxy can forward the traffic to the IoT device.

Otherwise, if it is determined at 304 that a timer for the traffic is not active, then, at 308, process 300 can determine whether the traffic is http traffic or non-http traffic. This determination can be made in any suitable manner, such as by determining a destination port number identified in the traffic. More particularly, for example, traffic can be determined to be http traffic if it is directed to a port usually used for http traffic, such as port 80, port 8080, port 443, and/or any other suitable port, in some embodiments.

If it is determined at 304 that the traffic is http traffic, then at 310, process 300 can determine whether the traffic is from a browser. This determination can be made in any suitable manner in some embodiments. For example, in some embodiments, this determination can be made by inspecting a http user agent header in the traffic to determine if the traffic is from a browser.

If it is determined at 310 that the traffic is from a browser, then at 312, process 300 can redirect a connection attempt in the traffic to process 340 so that the user of the browser is required to log in. This redirection can be performed in any suitable manner.

As shown in process 340, at 342, the process detects the redirection. This detection can be made in any suitable manner.

Then, at 344, process 340 can perform a user login. This user login can be performed in any suitable manner. For example, as shown, at 344, process 340 can send a login request to process 370, which can receive the login request from process 340 at 372. Next, process 370 can receive user credentials and/or multifactor authentication (MFA) information at 374. Process 370 can then provide the user credentials and/or MFA information to server 106 at 376 and end at 378.

At 346, process 340 can then determine whether the login is valid. This determination can be made in any suitable manner, such as by comparing the user credentials and MFA information to credentials and MFA information stored in a secure database.

If at 346 process 340 determines that the login is valid, it can then notify user router 114 at 348 and then end at 354. As shown, process 300 can receive this notice of login at 314.

Otherwise, if at 346 process 340 determines that the login is not valid, then, at 350, process 340 can determine if the maximum login attempts have been made. If not, process 340 can loop back to 344. Otherwise, process 340 can log the login attempt activity at 352 and end at 354.

Referring back to process 300, after receiving the notice of login at 314, process 300 can start a timer for the IoT device for the traffic type (e.g., http or non-http traffic). This timer can have any suitable duration in some embodiments, including a duration from 1 to 60 seconds, 1 to 60 minutes, 1 to 24 hours, 1 day to 365 days, 1 year to 100 years, and/or an infinite duration.

After starting the time, process 300 can then branch to 306 at which the traffic can be passed to the IoT device as described above. The traffic can be passed in any suitable manner, such as by instructing a transparent proxy to forward the traffic.

If the traffic is determined to not be from a browser at 310, or if the traffic is determined to not be http traffic, then at 318, process 300 can block the traffic and notify server 106. The traffic can be blocked and the notification can be made in any suitable manner. For example, a transparent proxy can be instructed to block the traffic.

As shown in process 330, server 106 can receive the notification from 318 at 332. This notification can be received in any suitable manner.

Then, at 334, process 330 can alert a user device that the traffic is blocked and receive instruction on what to do with the blocked traffic. This can be performed in any suitable manner. For example, as shown in process 360, at 362, the receiver can receive an alert that the traffic is blocked (e.g., as a push notification to the user device), present that alert to a user as a pop-up notification on the user device, request instructions on what to do about the blockage (e.g., approve of block, enable traffic for a certain duration (e.g., from 1 to 60 seconds, 1 to 60 minutes, 1 to 24 hours, 1 day to 365 days, 1 year to 100 years, and/or an infinite duration), and receive the instructions. Then, process 360 can instruct the server in accordance with the user's instructions at 364 and end at 366.

Once the instructions have been received by process 330 at server 106 from process 360, process 330 can instruct user router 114 accordingly at 336 and end at 338. Process 300 on user router 114 can wait for and receive these instructions at 320.

At 322, process 300 can then determine whether to continue blocking the traffic. If so, process 300 can log the activity at 324 and then end at 326. Otherwise, process 300 can branch to 316 and proceed as described above.

It should be understood that at least some of the above described blocks of the process of FIG. 3 can be executed or performed in any order or sequence not limited to the order and sequence shown in and described in the figure. Also, some of the above blocks of the process of FIG. 3 can be executed or performed substantially simultaneously where appropriate or in parallel to reduce latency and processing times. Additionally or alternatively, some of the above described blocks of the process of FIG. 3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, systems, methods, and media for securing connections to IoT devices are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for securing connections to Internet of Things (IoT) devices, comprising:
a memory; and
a hardware processor coupled to the memory and configured at least to:
receive, at a server on the Internet, a notification that indicates that first inbound traffic from the Internet has been blocked at a router, wherein the first inbound traffic was destined for a first IoT device;

in response to receiving, at the server, the notification, send, from the server to a user device distinct from the server, an alert that indicates that the first inbound traffic has been blocked;

receive, at the server, first instructions from the user device indicating to unblock the first inbound traffic; and in response to receiving, at the server, the first instructions, send, from the server to the router, second instructions to unblock the first inbound traffic.

2. The system of claim 1, wherein the hardware processor is further configured to:

receive, at the server on the Internet, a second notification that indicates second inbound traffic from the Internet has been blocked at the router, wherein the second inbound traffic was destined for the first IoT device;

in response to receiving, at the server on the Internet, the second notification, send, from the server to the user device, a second alert that indicates that the second inbound traffic has been blocked; and receive, at the server, third instructions from the user device indicating to not unblock the second inbound traffic.

3. The system of claim 1, wherein the first instructions indicate that the first inbound traffic is to be unblocked for a given period of time and subsequent inbound traffic to the first IoT device is to be blocked after the given period of time.

4. The system of claim 1, wherein the hardware processor is further configured to:

detect a redirection of third inbound traffic at the server;

in response to detecting the redirection, send a login request to the user device;

receive login credentials from the user device;

in response to receiving the login credentials, determine that the login is valid; and in response to determining that the login is valid, notify the router that the login is valid.

5. The system of claim 1, wherein the hardware processor is further configured to:

detect a redirection of fourth inbound traffic at the server;

in response to detecting the redirection, send a login request to the user device;

receive login credentials from the user device;

in response to receiving the login credentials, determine that the login is not valid; and in response to determining that the login is not valid, determine if a maximum number of login attempts have been made.

6. The system of claim 5, wherein the hardware processor is further configured to:

log activity related to the login attempts.

7. A method for securing connections to Internet of Things (IoT) devices, comprising:

receiving, at a server on the Internet, a notification that indicates that first inbound traffic from the Internet has been blocked at a router, wherein the first inbound traffic was destined for a first IoT device;

in response to receiving, at the server, the notification, sending, from the server to a user device distinct from the server, an alert that indicates that the first inbound traffic has been blocked;

receiving, at the server, first instructions from the user device indicating to unblock the first inbound traffic; and in response to receiving, at the server, the first instructions, sending, from the server to the router, second instructions to unblock the first inbound traffic.

8. The method of claim 7, further comprising:

receiving, at the server on the Internet, a second notification that indicates second inbound traffic from the Internet has been blocked at the router, wherein the second inbound traffic was destined for the first IoT device;

in response to receiving, at the server on the Internet, the second notification, sending, from the server to the user device, a second alert that indicates that the second inbound traffic has been blocked; and receiving, at the server, third instructions from the user device indicating to not unblock the second inbound traffic.

9. The method of claim 7, wherein the first instructions indicate that the first inbound traffic is to be unblocked for a given period of time and subsequent inbound traffic to the first IoT device is to be blocked after the given period of time.

10. The method of claim 7, further comprising:

detecting a redirection of third inbound traffic at the server;

in response to detecting the redirection, sending a login request to the user device;

receiving login credentials from the user device;

in response to receiving the login credentials, determining that the login is valid; and in response to determining that the login is valid, notifying the router that the login is valid.

11. The method of claim 7, further comprising:

detecting a redirection of fourth inbound traffic at the server;

in response to detecting the redirection, sending a login request to the user device;

receiving login credentials from the user device;

in response to receiving the login credentials, determining that the login is not valid; and in response to determining that the login is not valid, determining if a maximum number of login attempts have been made.

12. The method of claim 11, further comprising:

logging activity related to the login attempts.

13. A non-transitory computer-readable medium containing computer executable instructions that, when executed by a processor, cause the processor to perform a method for securing connections to Internet of Things (IoT) devices, the method comprising:

receiving, at a server on the Internet, a notification that indicates that first inbound traffic from the Internet has been blocked at a router, wherein the first inbound traffic was destined for a first IoT device;

in response to receiving, at the server, the notification, sending, from the server to a user device distinct from the server, an alert that indicates that the first inbound traffic has been blocked;

receiving, at the server, first instructions from the user device indicating to unblock the first inbound traffic; and in response to receiving, at the server, the first instructions, sending, from the server to the router, second instructions to unblock the first inbound traffic.

14. The non-transitory computer-readable medium of claim 13, the method further comprising:

receiving, at the server on the Internet, a second notification that indicates second inbound traffic from the Internet has been blocked at the router, wherein the second inbound traffic was destined for the first IoT device;

in response to receiving, at the server on the Internet, the second notification, sending, from the server to the user device, a second alert that indicates that the second inbound traffic has been blocked; and receiving, at the server, third instructions from the user device indicating to not unblock the second inbound traffic.

15. The non-transitory computer-readable medium of claim 13, wherein the first instructions indicate that the first inbound traffic is to be unblocked for a given period of time and subsequent inbound traffic to the first IoT device is to be blocked after the given period of time.

16. The non-transitory computer-readable medium of claim 13, the method further comprising:

detecting a redirection of third inbound traffic at the server;

in response to detecting the redirection, sending a login request to the user device;

receiving login credentials from the user device;

in response to receiving the login credentials, determining that the login is valid; and in response to determining that the login is valid, notifying the router that the login is valid.

17. The non-transitory computer-readable medium of claim 13, the method further comprising:

detecting a redirection of fourth inbound traffic at the server;

in response to detecting the redirection, sending a login request to the user device;

receiving login credentials from the user device;

in response to receiving the login credentials, determining that the login is not valid; and in response to determining that the login is not valid, determining if a maximum number of login attempts have been made.

18. The non-transitory computer-readable medium of claim 17, the method further comprising:

logging activity related to the login attempts.

* * * * *

UNITED STATES PATENT AND TRADEMARK OFFICE
CERTIFICATE OF CORRECTION

PATENT NO. : 11,665,137 B2  
APPLICATION NO. : 16/354932  
DATED : May 30, 2023  
INVENTOR(S) : Karkhanis Page 1 of 1

It is certified that error appears in the above-identified patent and that said Letters Patent is hereby corrected as shown below:

On the Title Page

Column 2, under Foreign Patent Documents:
"ER 2020140"
Should be:
--EP 2020140--

Signed and Sealed this
Twenty-sixth Day of December, 2023

Katherine Kelly Vidal
*Director of the United States Patent and Trademark Office*